United States Patent [19]

Schober

[11] Patent Number: 4,471,493
[45] Date of Patent: Sep. 11, 1984

[54] WIRELESS TELEPHONE EXTENSION UNIT WITH SELF-CONTAINED DIPOLE ANTENNA

[75] Inventor: Edward A. Schober, Haddon Heights, N.J.

[73] Assignee: GTE Automatic Electric Inc., Northlake, Ill.

[21] Appl. No.: 450,496

[22] Filed: Dec. 16, 1982

[51] Int. Cl.³ .......................... H04B 1/38; H04M 1/03
[52] U.S. Cl. ........................................ 455/90; 455/89; 455/97; 455/128; 455/129; 455/351; 179/2 EA; 343/702
[58] Field of Search ................... 455/89, 90, 95, 97, 455/128, 129, 348, 351; 179/2 EA; 343/702, 872, 793, 795; 361/422; 312/7.1; D14/53

[56] References Cited

U.S. PATENT DOCUMENTS

| | | | |
|---|---|---|---|
| D. 254,435 | 3/1980 | Ferron | D14/53 |
| 2,828,413 | 3/1958 | Bowers | 455/128 |
| 3,824,465 | 7/1974 | Blough | 455/90 |
| 3,980,952 | 9/1976 | Rapshys | 455/90 |
| 4,123,756 | 10/1978 | Nagata et al. | 343/702 |
| 4,344,184 | 8/1982 | Edwards | 455/128 |
| 4,397,035 | 8/1983 | Nothnagel | 455/90 |

Primary Examiner—Jin F. Ng
Attorney, Agent, or Firm—Robert J. Black; Peter Xiarhos

[57] ABSTRACT

A remote unit for use in a wireless extension telephone system having a self-contained dipole antenna. Utilizing the unique construction of the telephone instrument housing one element of the dipole is included in a planar element that functions normally to direct sound to a self-contained microphone and the other element of the antenna is a static shield used to protect components on printed circuit board included within the extension unit.

10 Claims, 2 Drawing Figures

WIRELESS TELEPHONE EXTENSION UNIT WITH SELF-CONTAINED DIPOLE ANTENNA

CROSS REFERENCE TO RELATED APPLICATIONS

U.S. patent applications, Ser. Nos. 450,405; 450,406; 450,407; 450,408; 450,410; and 450,420 filed on the same date as the present application and Ser. No. 450,497 filed on Mar. 23, 1983 are related to the present application.

BACKGROUND OF THE INVENTION

1. Technical Field

The present invention relates to a subscriber's extension telephone unit coupled by a radio link to an associated telephone line and more particularly to a subscriber's extension telephone unit having a completely self contained dipole antenna.

2. Background Art

To comply with current Federal Communication Commission Regulations, most wireless extension telephone units operate on a full duplex basis, transmitting incoming signals from the line via a base unit radio transmitter operating on a frequency of approximately 1.7 MHz. These signals are received at a portable or remote wireless extension unit while signals from the remote unit are transmitted back to the base unit for connection to the telephone line at a frequency of approximately 49 MHz.

Because under current Federal Communication Commission Regulations, only limited power can be utilized in the transmitters incorporated into wireless extension telephone units and certain restrictions also apply to the antennas utilized in this service, a number of different approaches have been utilized to provide efficient antennas and thus secure maximum range between the base and remote units incorporated in wireless extension telephone systems. Most commercially available wireless extension telephone remote units utilize telescoping type whip antennas as transmitting antennas. These units may extend to almost five feet in length, (approximately ¼ wave length at 49 MHz) or be shortened by inclusion of a loading coil or take the form of a helix. Units of this type are shown in U.S. Pat. Nos. 3,366,745, 3,476,882 and 3,567,787 as well as a number of more recent patents.

Wireless telephone extension remote units equipped with such antennas bear strong resemblence physically to the so-called "Walky-Talky" or "Handy-Talky" units utilized for emergency communications, amateur service and so called "citizen band" usage. While these units have the advantage of portability, the necessity (to gain maximum efficiency) of raising or lowering the antenna and the danger of striking other individuals or objects and causing damage thereto is a prime concern. Furthermore, telescoping whip antennas traditionally used for this service are easily destroyed or damage due to inadvertent placement in locations where they may be sat upon or other objects placed upon them. Likewise, they are subject to bending and twisting.

One solution to the drawbacks of the aforementioned whip type antennas for remote wireless extension units is taught in the Rovette TM cordless telephone distributed by Fracom/Rovafone International. This unit provides a wireless extension telephone unit consisting of a separate base and hand set genrally similar to the "Princess" ® and "Starlite" ® telephones manufactured by Western Electric and GTE Automatic Electric respectively. In the Rovette telephone, the antenna is included in the handset cord extending between the telephone base and the handset. While this arrangement eliminates many of the objections found with the whip type antenna, requirements for two separate pieces as a portion of the remote telephone unit restricts its portability and usage and at the same time substantially adds to the cost of the telephone unit.

Cordless telephones use various switching arrangements to disable the transmitter to conserve battery energy when not in the two way communication mode. At least one cordless telephone disables the transmitter when the handset is placed on the base by a switch on the base unit, while other commercial units use a manual switch, or a switch actuated by extending a telescoping antenna.

Accordingly, it is the object of the present invention to provide a new and improved wireless extension telephone remote unit with a self contained dipole antenna which overcomes the shortcomings found in many previous wireless extension telephone remote units.

SUMMARY OF THE INVENTION

The present invention consists of a wireless extension telephone remote unit equipped with a self-contained dipole antenna. The present wireless extension telephone remote unit is housed in a housing like that employed in the "Flip-Phone ®" telephone manufactured by GTE Automatic Electric Incorporated and like that disclosed in U.S. Pat. No. Des. 254,435 which issued to James R. Ferron on Mar. 11, 1980.

This unit consists of a plastic housing including a pushbutton dial, ear piece, microphone, all of the usual circuitry common thereto as well as a receiver operating on a frequency of approximately 1.7 MHz and a transmitter operated at a frequency of approximately 49 MHz. All of the electronic circuitry and the above noted transmitter and receiver are located on a printed circuit board contained within the phone. A particular distinctive feature of the housing is a planar section hinged to the basic housing which during conversation acts to direct sound to an opening behind which the microphone is mounted. When not in operation, the planar unit folds against the housing operating a switch included in the telephone to disable the transmitter. The planar unit is automatically opened when the subset is picked up off of a flat surface by means of a spring unit included therein.

As in the Flip-Phone telephone, because of the nature of the electronic components mounted on the included circuit board, a static shield is provided between the printed circuit pushbutton dial circuit elements and printed circuit board. In the present unit, that metallic foil static shield is connected to the transmitter output as one element of a dipole antenna. A metallic plate affixed to the aforementioned planar section forms the other element of the dipole antenna and is electrically connected to the printed circuit board and hence the transmitter by means of contact through the spring noted above, one end of which contacts the dipole unit and the other end of which is connected by a wire conductor to the transmitter output stage.

In the non-operated or closed position, the static shield forming one element and the metallic plate included in the planar section lie parallel to each other. However, in operation the planar unit is opened under pressure of the spring included in the wireless extension remote unit and the two are placed in substantially the same plane forming a dipole antenna which in practice has found to be a reasonably good match for the transmitter included in the remote unit.

DESCRIPTION OF THE PREFERRED EMBODIMENT

Figure 1:
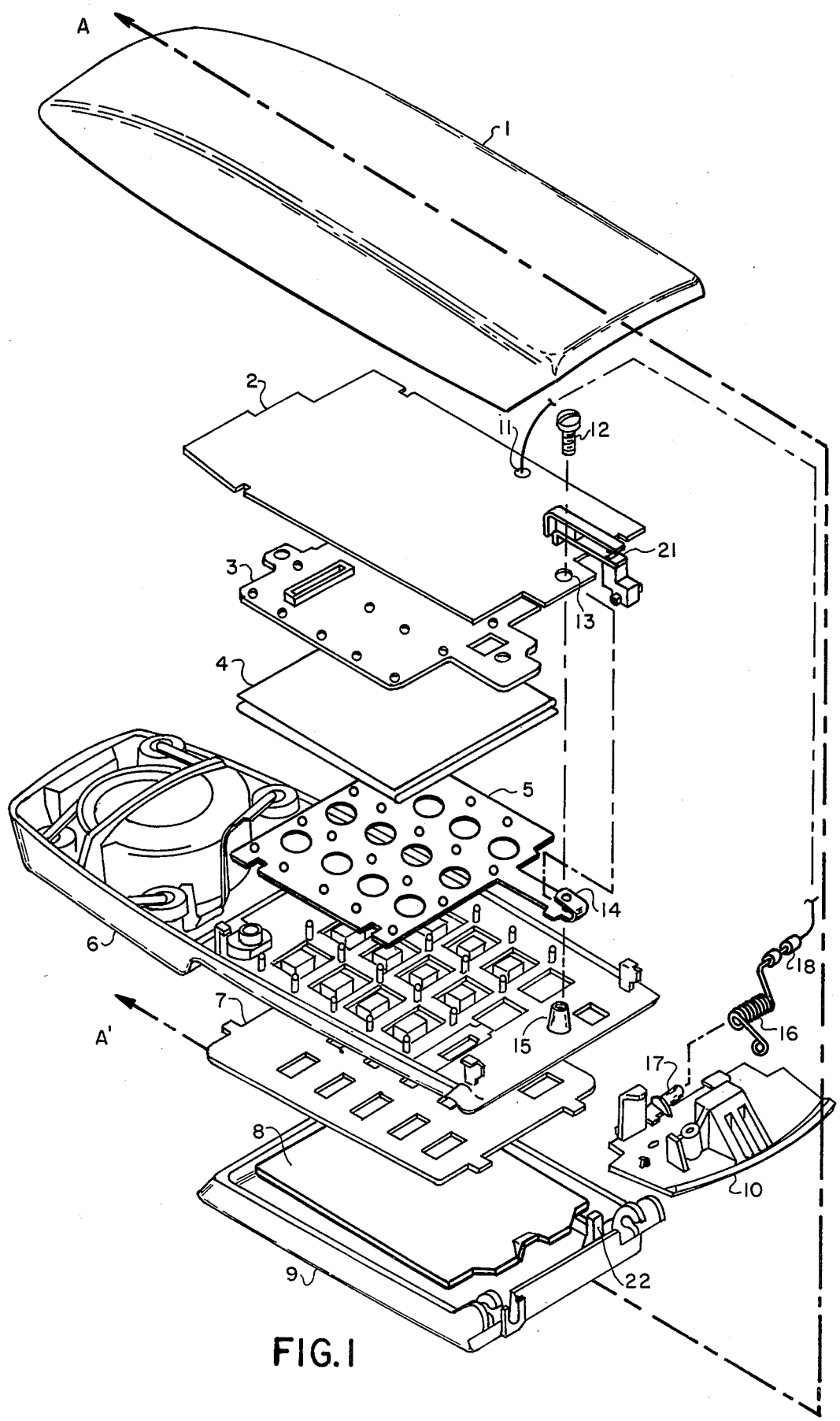
FIG. 1 is an exploded view of a wireless extention telephone including a self-contained dipole antenna in accordance with the present invention.

Referring now to FIG. 1 the wireless remote extension unit of the present invention is shown in an exploded form. The unit includes a housing base shell 1, and printed circuit board 2, including transmitter switch 21, the other components and circuitry of which have not been shown inasmuch as they do not form a portion of the present invention. Directly adjacent to the printed circuit board is a backplate or stiffener element 3 under which and adjacent to is located a mylar circuit strip 4 providing the necessary contacts for the pushbutton switches employed for dial pulse signalling in the present unit. Static shield 5 is located between the mylar circuit switching elements and pushbuttons that are included as a part of the housing shell equipment mounting unit 6.

Shown directly below the housing shell equipment mounting unit 6 is base plate 7 beneath which lies planar sound directing unit 9 which includes as a portion thereof metallic antenna element 8. It may be noted planer unit 9 includes hinges which fasten to mating units on the back of end cap 10 which are not visible in the present drawing. Details of hinging of the planer unit to the end cap 10 do not form a portion of the present invention. Boss 22 on sound directing unit 9 actuates switch 21 when planar unit 9 is folded closed on said hinges.

The end cap 10 contains thereon a spring mounting pin 17 on which spring 16 is positioned during assembly. As may be seen by reference to FIG. 2, at one end the spring projects through the end cap to make contact via connector 18 to a pad 11 on printed circuit board 2. This pad 11 on printed circuit board 2 is an output from the transmitter included on the printed circuit board. The static shield 5 has included thereon a tab which when the unit is assembled, is held in place against a contact 13 on printed circuit board 2 by screw 12. Contact 13 in turn is connected to the common or ground output of the transmitter or printed circuit board 2.

Figure 2:
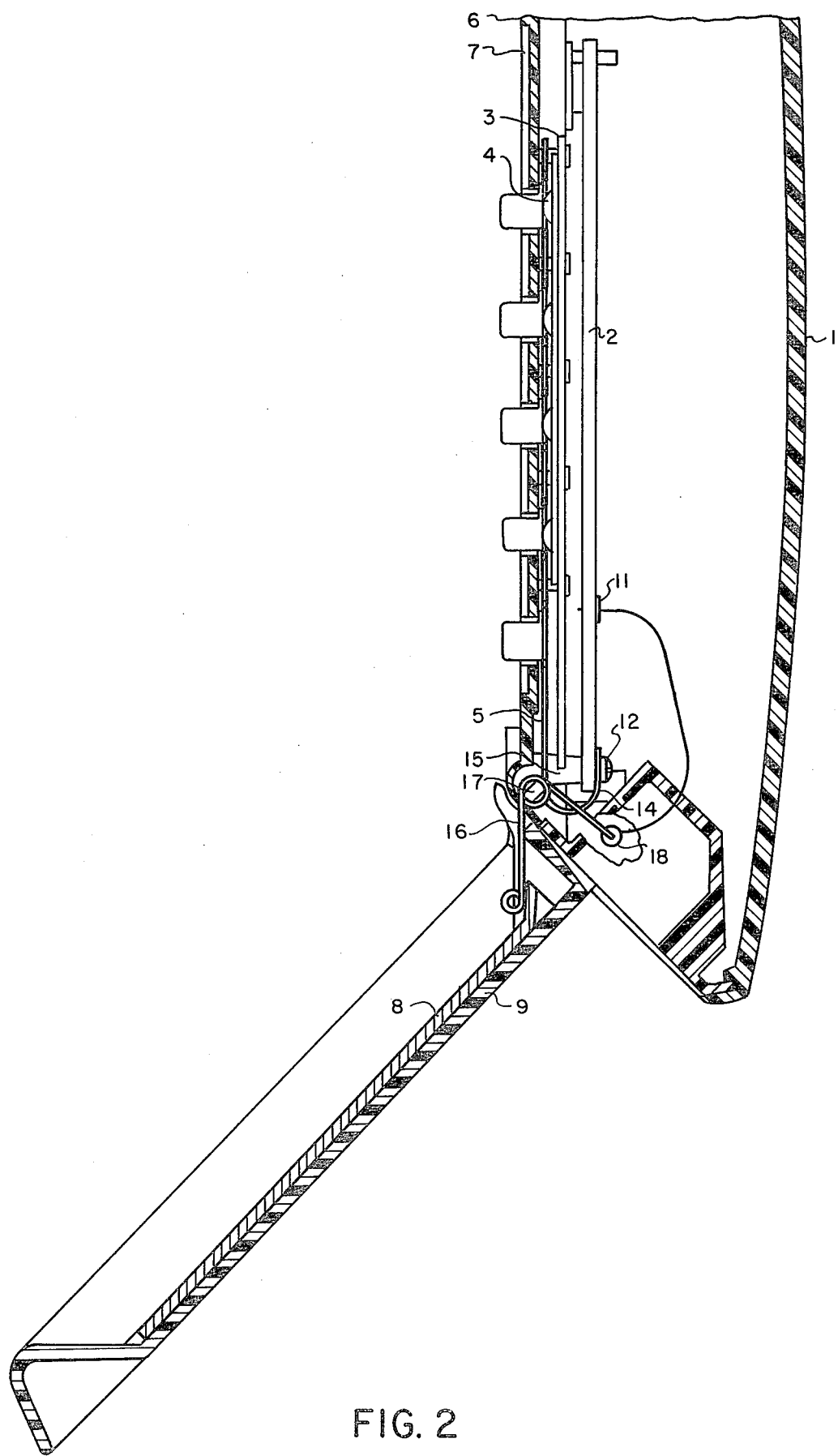
FIG. 2 is a sectional view of a wireless extension remote telephone taken along projection line A—A of FIG. 1, but in an assembled form.

Reference to FIG. 2 shows a sectional view of the wireless extension telephone remote unit in its assembled form with the planar unit in the open or operating position. The components shown in FIG. 2 carry the same identifying numbers as those shown in FIG. 1. From looking at FIG. 2 it may be seen that spring 16 thus is in contact with antenna element 8 at one end and electrically connected by conductor 18 to pad 11 on printed circuit board 2. As may be seen by reference to FIG. 2, the dipole antenna included in the remote wireless extension unit of the present invention consists of metallic element 8 affixed to planar surface 9 and static shield 5 included in the housing unit adjacent to the pushbuttons included in the housing equipment mounting section 6. It has been found in a practical embodiment of the present invention that the actual impedance of the antenna is approximately 31 Ohms at 49 MHz, providing a reasonably good match to the output stage of the transmitter included on printed circuit board 2.

An alternative embodiment is as above with the addition of a receiver also connected to pad 11 and grounded at contact 13 on printed circuit board 2.

Clearly, none of the problems found with whip antennas are present in the wireless remote extension unit described herein and the entire remote unit is a single, readily portable unit overcoming those disadvantages found in units equipped with whip antennas, or the obvious problems of cost and size associated with two piece units, like those found in the prior art.

While but a single embodiment of the present invention has been shown, it will be obvious to those skilled in the art that numerous modifications may be made without departing from the spirit of the present invention which shall be limited only by the scope of the claims appended hereto.

What is claimed is:

1. A wireless extension telephone remote unit including: a housing; a printed circuit board included within said housing; a radio transmitter circuit located on said printed circuit board; a first antenna element included within said housing and located adjacent to said printed circuit board and electrically connected to said radio transmitter; a planar unit flexibly mounted to said housing; and a second antenna element located on said planar unit and electrically connected to said radio transmitter; said first antenna element and said second antenna element in combination comprising a dipole antenna connected to said radio transmitter.

2. A wireless extension telephone remote unit as claimed in claim 1 wherein: said planar unit is hingedly mounted to said housing.

3. A wireless extension telephone remote unit as claimed in claim 2 wherein: said transmitter is disabled by a switching means actuated by said planar unit when said planar unit is folded on said hinged mounting against said housing.

4. A wireless extension telephone remote unit as claimed in claim 1 wherein: there is further included spring means positioned between said housing and said planar unit, operated to move said planar unit from a first location to a second location.

5. A wireless extension telephone remote unit as claimed in claim 4 wherein: said second antenna element is comprised of a metallic plate.

6. A wireless extension telephone remote unit as claimed in claim 5 wherein: said spring means is electrically connected between said radio transmitter and said metallic plate.

7. A wireless extension telephone remote unit as claimed in claim 1 wherein: said housing unit is constructed of electrically insulated material.

8. A wireless extension telephone remote unit as claimed in claim 1 wherein: said planar unit is constructed of electrically insulated material.

9. A wireless extension telephone remote unit as claimed in claim 1 wherein: said dipole antenna is further connected to a radio receiver.

10. A wireless extension telephone remote unit as claimed in claim 1 wherein: said first antenna element comprises a static shield constructed to metallic foil.

* * * * *